United States Patent
Thanner et al.

(10) Patent No.: US 9,342,258 B2
(45) Date of Patent: May 17, 2016

(54) INTEGRATED CIRCUIT DEVICE AND METHOD FOR PROVIDING DATA ACCESS CONTROL

(75) Inventors: Manfred Thanner, Neubiberg (DE); Nancy Amedeo, Austin, TX (US); Stephan Mueller, Taunusstein (DE); Anthony Reipold, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/238,495

(22) PCT Filed: Sep. 1, 2011

(86) PCT No.: PCT/IB2011/053837
§ 371 (c)(1),
(2), (4) Date: Feb. 12, 2014

(87) PCT Pub. No.: WO2013/030628
PCT Pub. Date: Mar. 7, 2013

(65) Prior Publication Data
US 2014/0201479 A1    Jul. 17, 2014

(51) Int. Cl.
*G06F 3/00* (2006.01)
*G06F 3/06* (2006.01)
*G06F 12/08* (2016.01)
*G06F 13/16* (2006.01)

(52) U.S. Cl.
CPC ............ *G06F 3/0656* (2013.01); *G06F 3/0611* (2013.01); *G06F 3/0671* (2013.01); *G06F 12/0862* (2013.01); *G06F 13/1673* (2013.01); *G06F 2212/6022* (2013.01)

(58) Field of Classification Search
None
See application file for complete search history.

(56) References Cited

U.S. PATENT DOCUMENTS

| | | | |
|---|---|---|---|
| 5,737,565 A | 4/1998 | Mayfield | |
| 6,347,055 B1 | 2/2002 | Motomura | |
| 6,871,246 B2 | 3/2005 | Moyer | |
| 7,370,161 B2 | 5/2008 | Kim et al. | |
| 7,882,310 B2 | 2/2011 | Inoue et al. | |
| 7,895,405 B2 | 2/2011 | Ebara et al. | |
| 2004/0068615 A1* | 4/2004 | Chaudhari et al. | 711/137 |
| 2004/0260908 A1 | 12/2004 | Malik et al. | |
| 2006/0053256 A1 | 3/2006 | Moyer et al. | |

OTHER PUBLICATIONS

International Search Report and Written Opinion correlating to PCT/IB2011/053837 dated Apr. 27, 2012.

* cited by examiner

*Primary Examiner* — Idriss N Alrobaye
*Assistant Examiner* — Richard B Franklin

(57) ABSTRACT

An integrated circuit device comprising at least one memory interface module arranged to be operably coupled between at least one data storage device and a plurality of master devices within a data processing system. The at least one memory interface module comprises a plurality of buffers and at least one data access control module. The at least one data access control module being arranged to fetch data from the at least one data storage device in response to a received memory access request comprising a master device identifier, select at least one buffer based at least partly on the master device identifier of the received access request, and load the fetched data into the selected at least one buffer.

18 Claims, 6 Drawing Sheets

INTEGRATED CIRCUIT DEVICE AND METHOD FOR PROVIDING DATA ACCESS CONTROL

FIELD OF THE INVENTION

The field of this invention relates to an integrated circuit device, a memory interface module, a data processing system and a method for providing data access control, and in particular to a method for providing data access control between at least one data storage device and a plurality of master devices.

BACKGROUND OF THE INVENTION

In the field of data processing systems, access to data stored within data storage devices such as flash memory arrays may be provided via an interface unit or the like. Such an interface unit is typically operably coupled to one or more data storage devices such as, flash arrays to enable access to data stored therein, and to a system interconnect such as, a system bus or crossbar switch for receiving data access requests from one or more master devices. Typically, such an interface unit further comprises a plurality of buffers, and may be arranged to perform prefetching of data in order to reduce the latency in accessing data stored within the data storage device(s) operably coupled thereto. When all of the interface unit buffers are filled with previously fetched data, it is necessary to replace data that is currently held within one or more of the buffers with newly fetched data. For example, the interface unit may be arranged to implement a replacement algorithm such as, a least recently used (LRU) or most recently used (MRU) algorithm, in order to determine which buffer's content is to be replaced with the newly fetched data. The implementation of such a replacement algorithm can significantly affect on the effectiveness of the prefetching performed by the interface unit.

Modern data processing systems often comprise a plurality of master devices requiring access to data stored within data storage devices. Accordingly, interface units for such data storage devices are often required to provide access to such data by multiple master devices, and in particular are required to perform prefetching of data in such a manner as to accommodate multiple master devices. A problem with conventional interface units performing prefetching of data for multiple master devices is that data accesses for the multiple master devices, and thus the prefetches therefor, compete for buffer space within the interface unit. Accordingly, prefetched data for one master device may overwrite data within a buffer of the interface unit previously fetched for another master device. Such buffer conflicts significantly reduce the effectiveness of the prefetching performed by the interface unit, and thus are detrimental to performance within multiple master processing systems.

One solution for reducing, or even avoiding, such buffer conflicts within multi-master data processing systems is to increase the number of interface units via which master devices are able to access data stored within a data storage unit; and to assign specific interface units to specific master devices. In this manner, the number of master devices that an interface unit is required to serve (i.e. provide access to data stored within the data storage device) may be reduced, and thus the problem of buffer conflicts may be reduced. However, increasing the number of interface units directly increases the required die size for the data processing systems, as well as increasing the number of system interconnect ports required for supporting the increased number of interface units, further increasing the required die size.

SUMMARY OF THE INVENTION

The present invention provides an integrated circuit device, a memory interface module, a data processing system and a method for providing data access control between at least one data storage device and a plurality of master devices as described in the accompanying claims.

Specific embodiments of the invention are set forth in the dependent claims.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the present invention will now be described with reference to the accompanying drawings. Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
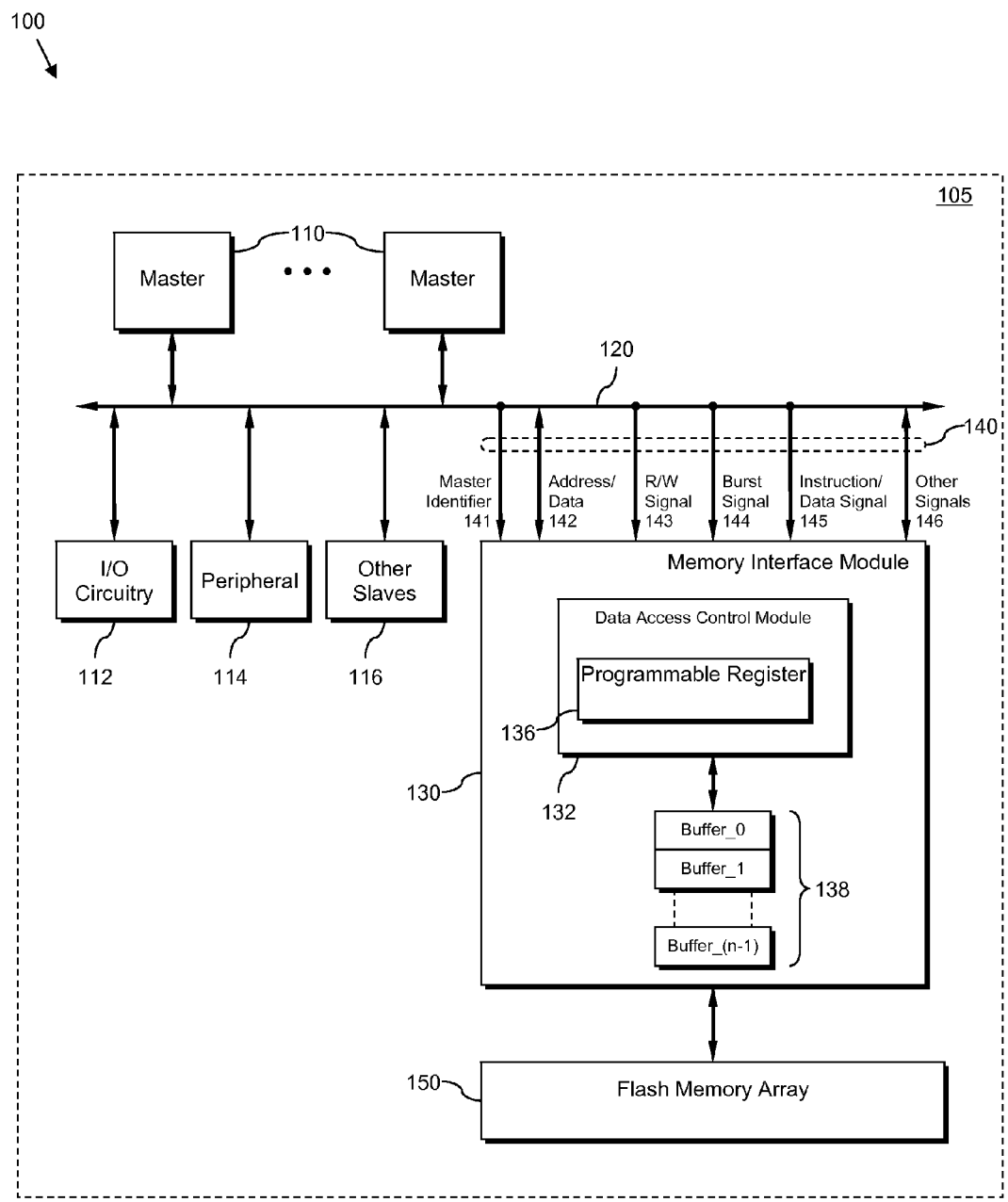
FIG. 1 illustrates a simplified block diagram of an example of a data processing system.

Referring first to FIG. 1, there is illustrated a simplified block diagram of an example of a data processing system 100. The data processing system 100 is implemented within an integrated circuit device 105 and comprises multiple master devices 110, for example comprising elements, such as processor cores, direct memory access (DMA) modules, etc. The data processing system 100 may comprise one or more slave devices such as input/output circuitry 112, one or more peripheral devices as illustrated generally at 114, and other slave devices as illustrated generally at 116. The data processing system 100 further comprises at least one system interconnect 120, for example as may be implemented by way of one or more system buses and/or one or more crossbar switches, arranged to enable communication between the various devices within the data processing system 100. In particular, the master devices 110 are bi-directionally coupled to the system interconnect 120 and arranged to send requests to, and receive responses from, slave devices via the system interconnect 120.

The data processing system 100 further comprises one or more memory interface modules, such as the memory interface module 130 illustrated in FIG. 1. The memory interface module 130 may be implemented as a slave device within the data processing system 100, and is arranged to be operably coupled between at least one data storage device, which in the illustrated example comprises a flash memory array 150, and the plurality of master devices 110. In the illustrated example, the memory interface module 130 is operably coupled to the system interconnect 120 by way of one or more memory interface ports, such as the memory interface ports illustrated generally at 140. The memory interface ports 140 in the illustrated example comprises various signal/data lines including, by way of example, master device identifier line(s) 141, address/data line(s) 142, a read/write signal line 143, a burst signal line 144, an instruction/data signal line 145 and various other signal lines illustrated generally at 146.

In operation, the master devices 110 request access of system interconnect 120 in order to communicate with slave devices 112, 114, 116, 130 within the data processing system 100, and in particular in order to request access to services, etc., provided thereby. For example, a master device 110 may send a memory access request to the memory interface module 130 via the system interconnect 120. Such a memory access request may comprise, for example, a read request or a write request, and may be for either data or instructions stored within the flash memory array 150.

In the illustrated example, the memory interface module 130 comprises at least one data access control module 132 arranged to receive such access requests from the master devices 110. In response to, say, a read request, the at least one data access control module 132 may provide the requested information (e.g. data or instructions) back to the requesting master device 110 via the system interconnect 120. The memory interface module 130 further comprises a plurality of buffers 138 within which data, the term data here being used to refer to data and/or instructions, fetched from the memory array 150 may be stored. The term 'data' herein used is to be understood as encompassing both data and instructions unless otherwise stated or apparent from the relevant context. In accordance with some examples of the present invention, the data access control module 132 is configured to fetch data from the memory array 150 in response to a received memory access request, such as a read request. The read request may comprise a master device identifier 141 for the requesting master device 110, in order to select at least one buffer from the plurality of buffers 138 based at least partly on the master device identifier 141 of the received access request, and to load the fetched data into the selected buffer(s) 138.

In this manner, selecting the buffer within which fetched data is to be stored, based (at least partly) on the master device identifier of the access request in response to which the data has been fetched, buffer conflicts between inter-master data fetches may be reduced, and thus the detrimental effect of such conflicts on the effectiveness of, say, prefetching performed by the memory interface unit may be reduced.

For example, the data access control module 132 may be arranged to associate a first set of buffers with a first master device identifier and at least one further set of buffers with at least one further master device identifier, and to select at least one buffer into which fetched data is to be loaded from the set of buffers with which the master device identifier of the received access request is associated.

Figure 2:
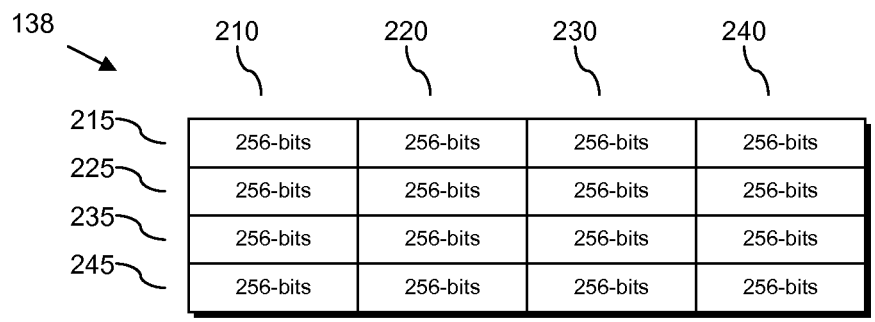
FIGS. 2 and 3 illustrate simplified block diagrams of buffer arrangements.

For example, FIG. 2 illustrates an example of the buffers 138 of the data access control module 132, whereby the buffers 138 comprise a n*m buffer arrangement of 256-bit buffers, with the buffers 138 (at least notionally) arranged into, for example, four columns 210, 220, 230, 240 of four rows 215, 225, 235, 245.

Figure 3:
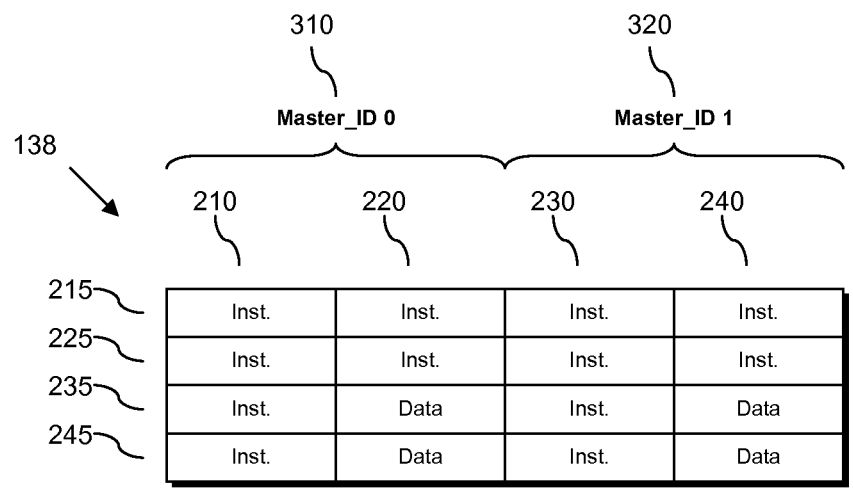

As illustrated in FIG. 3, the data access control module 132 may be arranged to associate, for example, a first set of buffers comprising the buffers within the first and second columns 210, 220 with a first master device identifier 310, and to associate a second set of buffers comprising the buffers within the third and fourth columns 230, 240 with a second master device identifier 320.

In this manner, data fetched in response to an access request from the master device 110, to which the first master device identifier 310 relates, may be loaded into a buffer selected from the first set of buffers comprising the first and second columns 210, 220. Conversely, data fetched in response to an access request from the master device 110, to which the second master device identifier 320 relates, may be loaded into a buffer selected from the second set of buffers comprising the third and fourth columns 230, 240. Thus, by associating discrete sets of buffers to different master device identifiers, buffer conflicts between inter-master data fetches may be substantially alleviated without a need for providing separate memory interface ports via which master devices are able to access data stored within a data storage unit.

In some examples, the data access control module 132 may be further arranged to select a buffer into which fetched data is to be loaded, based on additional aspects of the access request in response to which the data has been fetched. In some examples, the data access control module 132 may be further arranged to select at least one buffer into which fetched data is to be loaded, based at least partly on at least one from a group consisting of:
    (i) an information type
    (ii) buffer availability; and
    (iii) a replacement algorithm.

For example, and as illustrated in FIG. 3, the buffers 138 may be further associated with a particular information type (e.g. data or instruction). In the illustrated example the first six buffers in each set are associated with an instruction (inst.) information type, whilst the last two buffers in each set being associated with a data information type. In this manner, the data access control module 132 may be arranged to select a buffer into which fetched data is to be loaded based on the master device identifier 141 of the received access request and the instruction/data signal 145 of the received access request. The selected buffer is associated with the master device identifier and with the information type for the received access request.

Additionally and/or alternatively, the data access control module 132 may be further arranged to determine whether or not at least one buffer associated with the master device identifier of the received access request is available (e.g. whether or not the buffer contains currently valid information or information that can be replaced based on the chosen replacement algorithm), and to select a buffer associated with the master device identifier of the received access request for loading fetched data into, if it is determined that such a buffer is available.

Additionally and/or alternatively, the data access control module 132 may be further arranged to select a buffer into which fetched data is to be loaded, based on a replacement algorithm. For example, where all buffers associated with the master device identifier (and optionally the information type) of the received access request contain valid data, and thus no buffers are available, the data access control module 132 may be arranged to select a buffer that is associated with the master device identifier (and optionally the information type) of the received access request using a replacement algorithm such as, by way of example, a last least recently used (LRU) algorithm, a most recently used (MRU) algorithm, etc.

Figure 4:
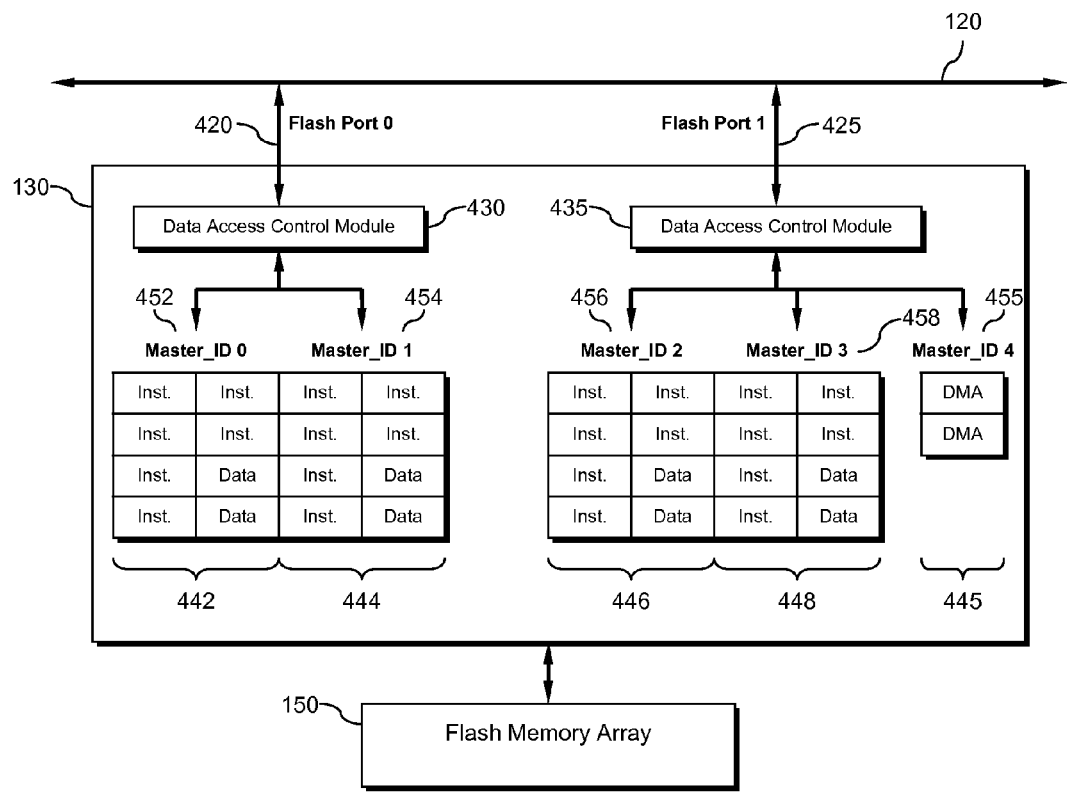
FIG. 4 illustrates a simplified block diagram of an example of a memory interface module.

Referring now to FIG. 4, there is illustrated a simplified block diagram of an alternative example of a memory interface module 130. The memory interface module 130 of FIG. 4 is operably coupled to the system interconnect 120 by way of a first memory interface port 420 and a second memory interface port 425. Each of the first and second memory interface ports 420, 425 comprises various signal data lines, such as those illustrated in FIG. 1 for the memory interface port 140. The memory interface module 130 of FIG. 4 further comprises a first data access control module 430 that is operably coupled to the first memory interface port 420 and arranged to receive and respond to memory access requests from master devices thereby. The memory interface module 130 of FIG. 4 further comprises a second data access control module 435 operably coupled to the second memory interface port 425 and arranged to receive and respond to memory access requests from master devices thereby. In particular for the illustrated example, the first data access control module 430 is arranged to receive memory access requests from two master devices (not shown) via the first memory interface port 420. The second data access control module 435 is arranged to receive memory access requests from, say, three different master devices (not shown) via the second memory interface part 425. The memory interface module 130 is further operably coupled to the memory array 150 to enable data to be fetched therefrom, and written thereto, by the first and second data access control module 430, 435.

The memory interface module 130 further comprises a first set of buffers for use by the first data access control module 430. In the illustrated example, the first data access control module 430 is arranged to associate a first sub-set of these buffers, illustrated at 442, with a first master device identifier 452 that corresponds to a first master device from which the first data access control module 430 is arranged to receive memory access requests, and associate a second sub-set of these buffers, illustrated at 444, with a second master device identifier 454 that corresponds to a second master device from which the first data access control module 430 is arranged to receive memory access requests. The first data access control module 430 is further arranged to associate buffers within the first and second sub-sets of buffers 442, 444 therefor with an information type; e.g. with either an instruction information type or a data information type. In this manner, the first data access control module 430 may be arranged to fetch data from the memory array 150 in response to a received memory access request, such as a read request, comprising one of the first or second master identifiers 452, 454 for the requesting master device, in order to select at least one buffer from the first and second buffer sub-sets 442, 444 therefor based on the master device identifier (and in the illustrated example the information type), and to load the fetched data into the selected buffer.

The memory interface module 130 further comprises a second set of buffers for use by the second data access control module 435. In the illustrated example, the second data access control module 435 is arranged to associate a first sub-set of these buffers, illustrated at 446, with a third master device identifier 456 that corresponds to a third master device from which the second data access control module 435 is arranged to receive memory access requests. The second data access control module 435 is further arranged to associate a second sub-set of these buffers, illustrated at 448, with a fourth master device identifier 458 corresponding to a fourth master device from which the second data access control 435 is arranged to receive memory access requests. The second data access control module 435 is further arranged to associate a third sub-set of these buffers, illustrated at 445, with a fifth master device identifier 455 that corresponds to a fifth master device from which the second data access control module 435 is arranged to receive memory access requests from. The second data access control module 435 is further arranged to associate buffers within the first and second sub-sets of buffers 446, 448 therefor with an information type; e.g. with either an instruction information type or a data information type. In this manner, the second data access control module 435 may be arranged to fetch data from the memory array 150 in response to a received memory access request, such as a read request, comprising one of the third, fourth or fifth master identifiers 455, 456, 458 for the requesting master device, in order to select at least one buffer from the first, second and third buffer sub-sets 445, 446, 448 therefor, based on the master device identifier (and in the illustrated example the information type), and to load the fetched data into the selected buffer.

Referring back to FIG. 1, the data access control module 132 comprises at least one programmable register 136 for storing buffer configuration parameters. For example, the programmable register 136 may comprise one or more parameters such as: master device identifier; and information type indicator.

Figure 5:
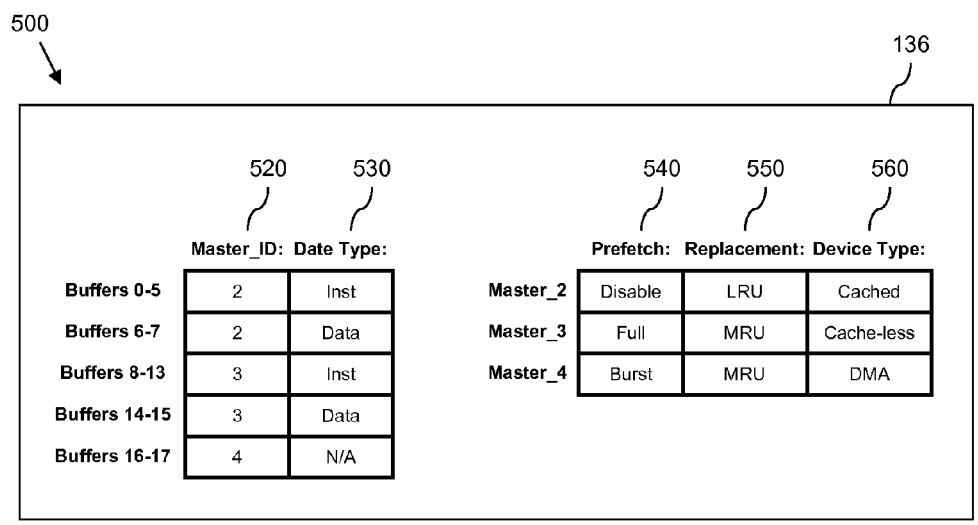
FIG. 5 illustrates a simplified block diagram of an example of a buffer configuration register.

For example, referring to FIG. 5, there is illustrated an example of the contents of such a programmable register for storing buffer configuration parameters. In particular, the example illustrated in FIG. 5 illustrates buffer configuration parameters 500 for configuring the set of buffers 445, 446, 448 used by the second data access module 435 illustrated in FIG. 4, and thus which may be stored within a programmable register 136 within the second data access control module 435. The buffer configuration parameters in the illustrated example comprise a first set of parameters 520 for associating a master device identifier for each buffer. A second set of parameters 530 enable an information type, for example an instruction type or data type, to be associated with each buffer.

Additional configuration parameters may also be stored within the programmable register 136, or within an alternative register, in order to enable prefetching and other functionality of the data access control module(s) 132, 430, 435 to be configured. For example, such additional configuration parameters may include, say, prefetching configuration indicator parameters 540 for individual master devices whereby prefetching for specific master devices may be configured to be perform, for example, upon receipt of any read request (e.g. 'Full' prefetching), only upon receipt of a data burst read request (e.g. 'Burst' prefetching), or configured to be disabled.

Additionally and/or alternatively, such additional configuration parameters may include, say, replacement configuration indicator parameters 550 for individual master devices whereby specific replacement algorithms may be configured to determine which buffer's content is to be replaced with the newly fetched data, and thus which buffer to select for loading fetched data in to. For example, such parameters may be used to specify whether, say, a least recently used (LRU) or most recently used (MRU) replacement algorithm should be used. In this manner, data access control module 435 may be further arranged to select a buffer into which fetched data is to be loaded, based at least partly on the replacement algorithm associated with the master device identifier of the received access request.

Additionally and/or alternatively, such additional configuration parameters may include, say, master device type indicator parameters 560 for individual master devices, whereby characteristics of master devices may be defined. For example, such characteristics may include whether or not a master device comprises a cached processing core, a cache-less processing core, a direct memory access (DMA) module, etc. In this manner, prefetching and other functionality performed by the data access control module(s) 132, 430, 435 may be adapted in accordance with such defined characteristics of the master device from which an access request is received. For example, the data access control module(s) 132, 430, 435 may be further arranged to, upon data within a buffer being fully read by a master device, determine whether or not to free up that buffer to make it available for subsequently fetched data, based on the master device type indicator for master device identifier associated with that buffer. For example, where the master device type indicator defines the master device as being, say, a cache-less processor, the data access control module(s) 132, 430, 435 may be arranged to retain the content of the buffer upon the data within the buffer being fully read. Conversely, where the master device type indicator defines the master device as being, say, a DMA module or a cached processor, the data access control module(s) 132, 430, 435 may be arranged to free up the buffer upon the data within the buffer being fully read.

For the example illustrated in FIG. 1, the programmable register 136 comprises an integral part of the data access control module 132. Accordingly, for the example illustrated in FIG. 4, a programmable register 136 may be implemented within each of the data access control modules 430, 435. However, the programmable register 136 is not limited to forming an integral part of the data access module(s) 132, 430, 435, and may form a discrete component within or external to the memory interface module 130. Furthermore, for the example illustrated in FIG. 4, one or more shared programmable registers may be implemented, whereby both of the data access control modules 430, 435 are arranged to access parameters stored therein.

Examples of a memory interface module 130, and an integrated circuit device 105 and a data processing system 100 comprising such a memory interface module 130, have been described wherein a buffer into which fetched data is to be loaded is selected based at least partly on a master device identifier of a received access request in response to which the data is fetched. In this manner, buffer conflicts resulting from multi-master device memory accesses may be substantially avoided whilst enabling the number of memory interface ports to be kept low. Accordingly, sufficient prefetching performance may be achieved within multi-master data processing systems, whilst keeping the number of memory interface ports and the respective die size impact thereof low.

Figure 6:
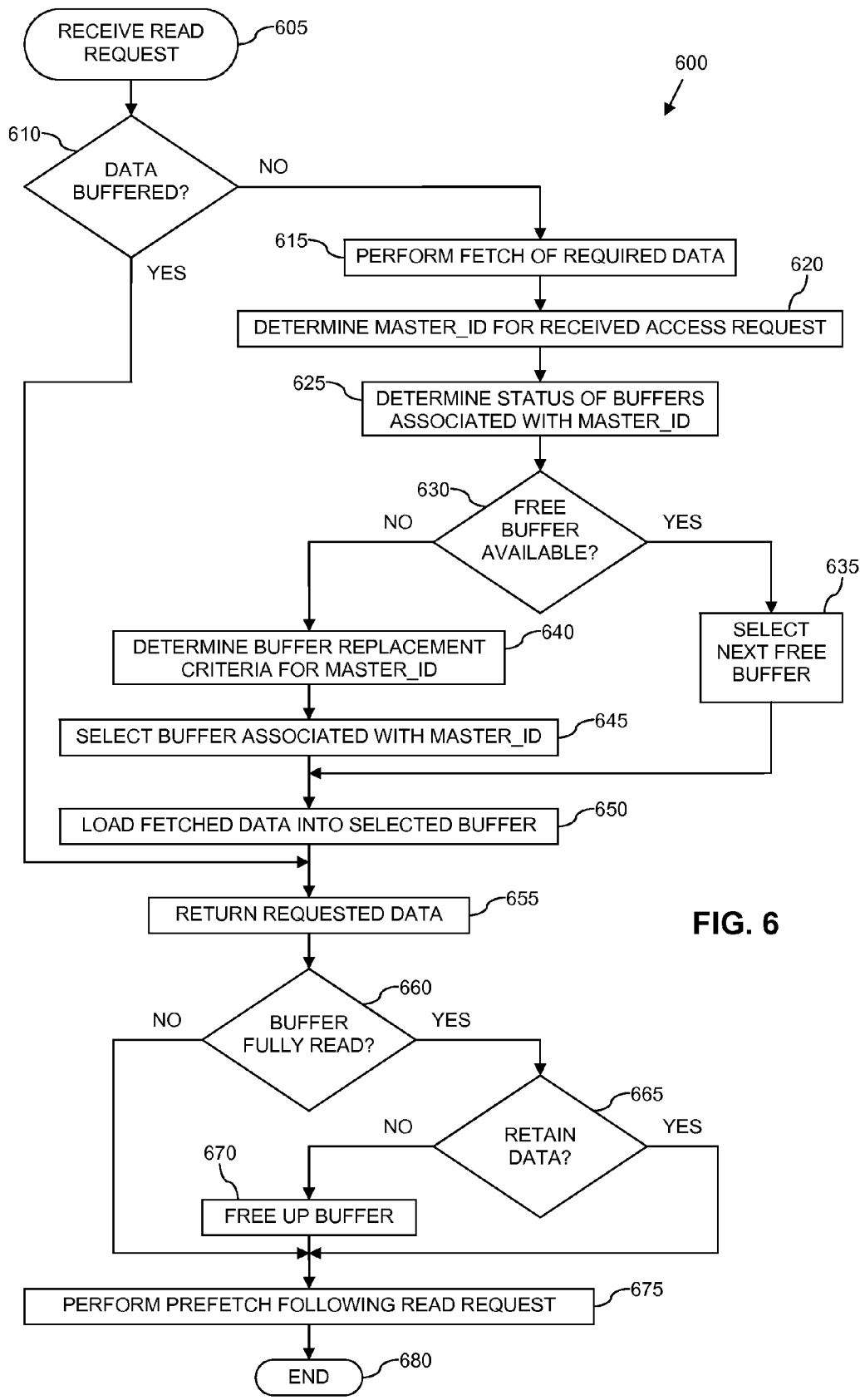
FIGS. 6 and 7 illustrate simplified flowcharts of an example of a method for providing data access control.
Figure 7:
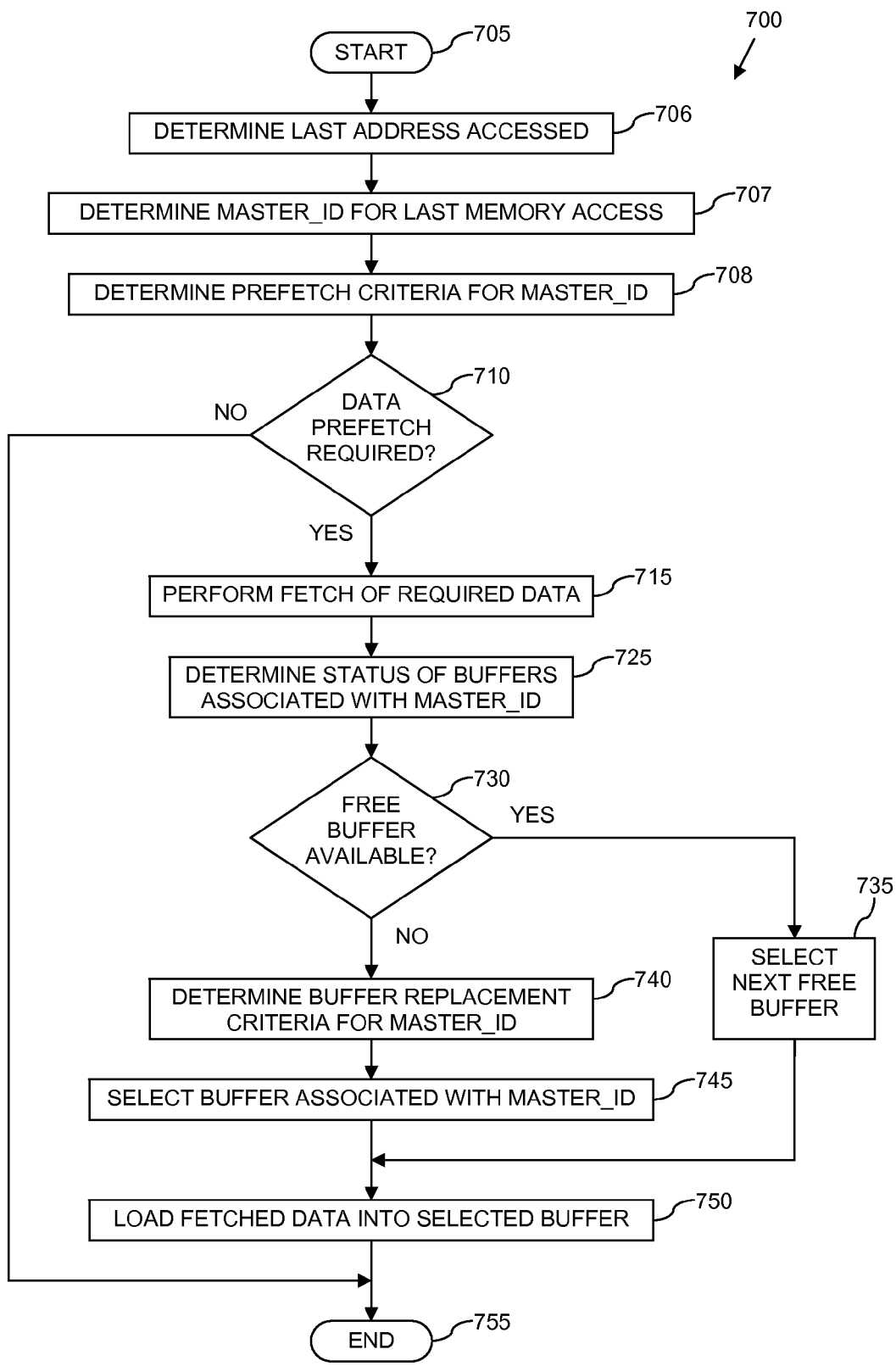

Referring now to FIGS. 6 and 7, there are illustrated simplified flowcharts 600, 700 of an example of a method for providing data access control between at least one data storage device and a plurality of master devices, such as may be implemented within the memory interface module 130 of FIG. 1. The method starts at 605 with a receipt of an access request, which in the illustrated example comprises a read request, from a master device, such as one of the master devices 110 of FIG. 1. The method then moves on to 610, where it is determined whether or not the requested data is present within a prefetch buffer, such as one of the buffers 138 of FIG. 1. If the requested data is present within a prefetch buffer, the method moves on to 655 where the requested data is returned to the requesting master device. Conversely, if the requested data is not present within a prefetch buffer, in 610, the method moves on to 615, where a fetch operation is performed for the required data (e.g. comprising the requested data) from memory, for example from the memory array 150 of FIG. 1. Such required data may comprise data or one or more instructions as specified within the received access request. Next, at 620, a master device identifier is determined for the received access request. For example, the master device identifier may be determined based on one or more master identifier line signals within a memory interface port via which the access request is received, such as the master device identifier line(s) 141 of FIG. 1.

In the illustrated example, the status of buffers associated with the master device identifier is then determined 625, for example in order to determine whether or not at least one buffer associated with the master device identifier of the received access request is available (e.g. does not contain currently valid data). If, at 630, it is determined that at least one buffer associated with the master device is available, the method moves on to 635, where a next buffer associated with the master device is selected, for example based on a reverse numeric priority scheme (e.g. 0→1→2→3). Conversely, in 630, if it is determined that no buffers associated with the master device identifier are available, the method moves on to 640, where buffer replacement criteria are determined for buffers associated with the determined master device identifier. For example, a replacement algorithm may be specified for each master device indicator, such as an LRU or MRU replacement algorithm. A buffer associated with the master device indicator is then selected using the determine buffer replacement criteria (e.g. using the appropriate replacement algorithm) at 645. Having selected a buffer, either at 635 or 645, the method then moves on to 650, where data fetched in response to the received read request is loaded into the selected buffer. Next, at 655, the requested data, which was part of the data fetched from memory in response to the received access request, is then returned to the master device from which the access request originated.

In the illustrated example, the method then moves on to 660, where it is determined whether or not the buffer containing the requested data has been fully read. If the buffer containing the requested data has not been fully read, the method moves on to 675, where prefetch procedure in response to the received access request is performed. Conversely, if it is determined that the buffer containing the requested data has been fully read, the method moves to 665, where it is determined whether or not the data within that buffer is to be maintained or the buffer freed up and made available for subsequently fetched data to be loaded into. For example, such a determination may be based on, say, a master device type parameter 560 for the master device indicator associated with the buffer, such as may be stored within the register 136 of FIG. 1. If it is determined that the content of the buffer should be retained, for example where the master device comprises, say, a cache-less processor, the method moves to on to 675, and the prefetch procedure in response to the received access request is performed. Conversely, if it is determined that the content of the buffer should not be retained, for example where the master device comprises, say, a DMA module, the method moves on to 670 where the buffer is freed up and made available for subsequently fetched data to be loaded into, and then moves on to 675, where the prefetch procedure in response to the received access request is performed. The method then ends at 680.

FIG. 7 illustrates a simplified flowchart 700 of an example of a prefetch procedure, such as may be implemented within 675 of FIG. 6. The procedure starts at 705, and moves on to 706, where a last address in memory accessed is determined, such as the address within the memory array 150 of FIG. 1 to which the access request received at 605 related. Next, at 707, a master device identifier is determined for the last memory access. For example, the master device identifier may be determined based on one or more master identifier line signals within a memory interface port via which the access request is received, such as the master device identifier line(s) 141 of FIG. 1.

Prefetch criteria for the master device identifier is then determined at 708. For example, prefetch criteria may be specified for each master device indicator by way of prefetching configuration indicator parameters whereby prefetching for specific master devices may be configured to be perform, for example, upon receipt of any read request (e.g. 'Full' prefetching), only upon receipt of a data burst read request (e.g. 'Burst' prefetching), or configured to be disabled. Having determined the prefetch criteria for the master device identifier, it is then determined whether or not data prefetching is required, at 710. If data prefetching is not required, the procedure ends, at 755. However, if data prefetching is required, the procedure moves on to 715, where a fetch is performed for data to be prefetched from memory (e.g. for data within a block of data within the memory array 150 immediately following that of the block containing the last accessed address). Next, at 725, the status of buffers associated with the master device identifier is then determined, for example in order to determine whether or not at least one buffer associated with the master device identifier of the received access request is available (i.e. does not contain currently valid data). If, at 730, it is determined that at least one buffer associated with the master device is available, the method moves on to 735, where a next buffer associated with the master device is selected, for example based on a reverse numeric priority scheme (e.g. 0→1→2→3). Conversely, if it is determined that no buffers associated with the master device identifier are available, the method moves on to 740, where buffer replacement criteria are determined for buffers associated with the determined master device identifier. For example, a replacement algorithm may be specified for each master device indicator, such as an LRU or MRU replacement algorithm. A buffer associated with the master device indicator is then selected using the determine buffer replacement criteria (e.g. using the appropriate replacement algorithm) at 745. Having selected a buffer, either at 735 or 745, the method then moves on to 750, where data fetched in response to the received read request is loaded into the selected buffer. The procedure then ends at 755.

Figure 8:
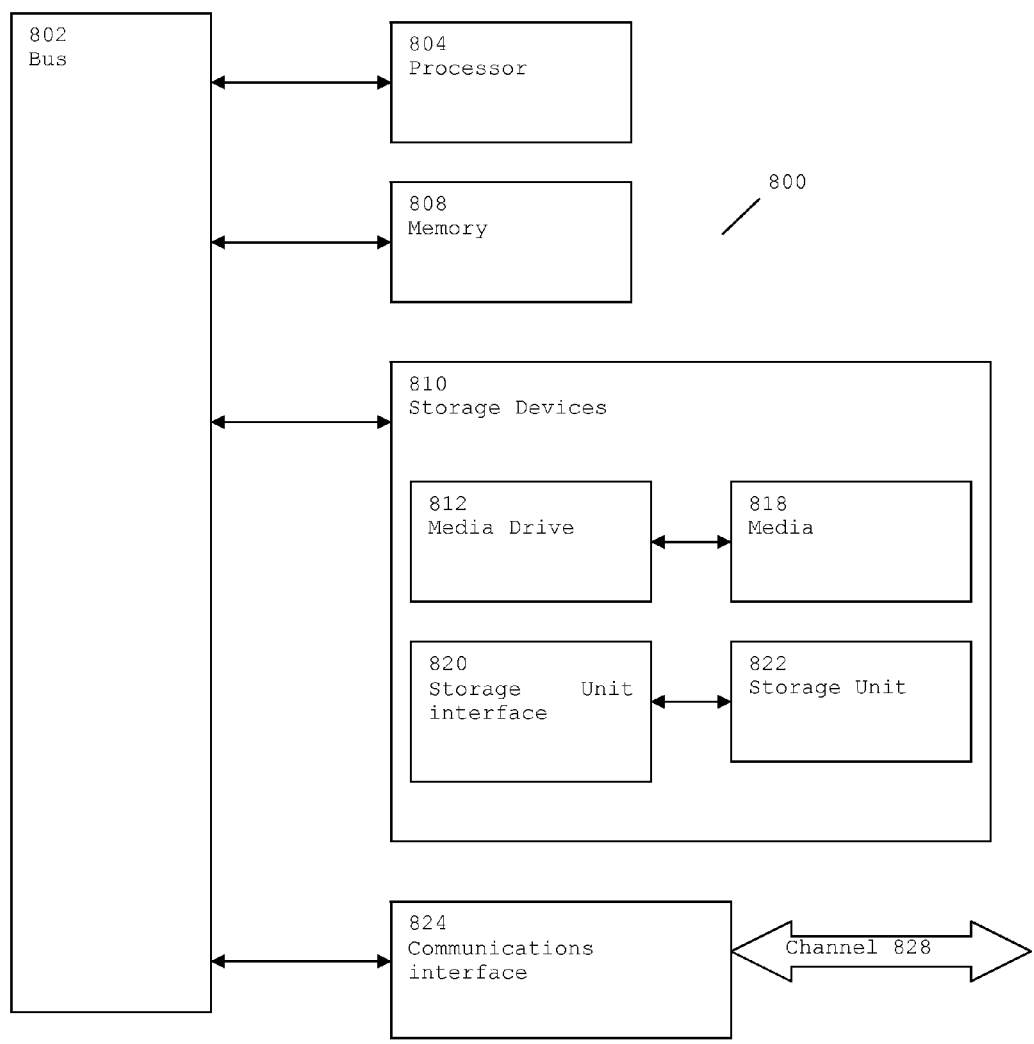
FIG. 8 illustrates an example of a typical programmable signal processing system.

Referring now to FIG. 8, there is illustrated an example of a typical programmable signal processing system 800 that may be employed to implement signal processing functionality in embodiments of the invention, and in particular may be employed to implement at least part of the method of FIGS. 6 and 7. Programmable signal processing systems of this type may be used in embedded devices, desktop computers, workstations etc. Those skilled in the relevant art will also recognize how to implement the invention using other computer systems or architectures. Programmable signal processing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Programmable signal processing system 800 can include one or more signal processing modules, such as a processor 804. Processor 804 can be implemented using a general or special-purpose processing engine such as, for example, a microprocessor, microcontroller or other control module. In this example, processor 804 is connected to a bus 802 or other communications medium.

Programmable signal processing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Programmable signal processing system 800 may likewise include a read only memory (ROM) or other static storage device coupled to bus 802 for storing static information and instructions for processor 804.

The programmable signal processing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into programmable signal processing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 822 to programmable signal processing system 800.

Programmable signal processing system 800 can also include a communications interface 824. Communications interface 824 can be used to allow software and data to be transferred between programmable signal processing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the programmable signal processing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium transistor or non-transistor and loaded into programmable signal processing system 800 using, for example, removable storage drive 822, drive 812 or communications interface 824. The control module (in this example, software instructions or executable computer program code), when executed by the processor 804, causes the processor 804 to perform the functions of the invention as described herein.

Accordingly, the invention may be implemented in a computer program for running on a programmable signal processing system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for memory interface module 130 has been illustrated as comprising a separate and distinctive functional unit within the examples of FIGS. 1 and 4. However, the memory interface module 130 may equally be implemented as an integral part of a data storage device, such as the data storage device comprising the memory array 150.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, in the example illustrated in FIG. 1, the data processing system 100 and memory array 150 have been illustrated as being implemented within a single integrated circuit device 105. However, it is contemplated that the memory array 150 may equally be implemented within a separate integrated circuit device to that of the data processing system 100, with the memory interface module 130 being implemented within either of the integrated circuit devices thereof.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising at least one memory interface module arranged to be operably coupled between at least one data storage device and a plurality of master devices within a data processing system; the at least one memory interface module comprising a plurality of buffers and at least one data access control module, the at least one data access control module being arranged to:
   fetch data from the at least one data storage device in response to a received memory access request comprising a master device identifier;
   select at least one buffer based at least partly on the master device identifier of the received access request;
   configuring the selected at least one buffer based on a master device type indicator, wherein the master device type indicator identifies a type of the master device; and
   load the fetched data into the selected at least one buffer.

2. The integrated circuit device of claim 1 wherein the at least one data access control module is arranged to associate a first set of buffers with a first master device identifier and at least one further set of buffers with at least one further master device identifier.

3. The integrated circuit device of claim 2 wherein the at least one data access control module is further arranged to select at least one buffer into which fetched data is to be loaded from the set of buffers with which the master device identifier of the received access request is associated.

4. The integrated circuit device of claim 1 wherein the at least one data access control module is further arranged to select at least one buffer into which fetched data is to be loaded based at least partly on at least one from a group consisting of:
   an information type;
   buffer availability; and
   a replacement algorithm.

5. The integrated circuit device of claim 4 wherein the at least one data access control module is further arranged to select at least one buffer into which fetched data is to be loaded based at least partly on a replacement algorithm associated with the master device identifier of the received access request.

6. The integrated circuit device of claim 1 wherein the memory interface unit comprises at least one programmable register for storing configuration parameters comprising at least one from a group consisting of:
   an information type indicator;
   a prefetch configuration indicator; and
   a replacement configuration indicator.

7. The integrated circuit device of claim 1 wherein the at least one data access control module is further arranged to:
   determine whether at least one buffer associated with the master device identifier of the received access request is available; and
   select a buffer associated with the master device identifier of the received access request for loading fetched data into, if it is determined that such a buffer associated with the master device identifier of the received access request is available.

8. The integrated circuit device of claim 7 wherein the at least one data access control module is further arranged to select a buffer associated with the master device identifier of the received access request based at least partly on a defined replacement algorithm, if it is determined that such a buffer associated with the master device identifier of the received access request is not available.

9. The integrated circuit device of claim 1 wherein the at least one data access control module is further arranged to, upon data within a buffer being fully read by a master device, freeing up that buffer to make it available for subsequently fetched data.

10. A method for providing data access control between at least one data storage device and a plurality of master devices, the method comprising, within a data processing system:
   fetching data from the at least one data storage device in response to a received memory access request comprising a master device identifier;

selecting at least one buffer from among a plurality of buffers based at least partly on the master device identifier of the received access request;

configuring the selected at least one buffer based on a master device type indicator, wherein the master device type indicator identifies a type of the master device; and loading the fetched data into the selected at least one buffer.

11. The method of claim 10 wherein a first set of buffers is associated with a first master device identifier and at least one further set of buffers is associated with at least one further master device identifier.

12. The method of claim 11 wherein the selecting the at least one buffer comprises selecting the at least one buffer from the set of buffers associated with the master device identifier of the received access request is associated.

13. The method of claim 10 wherein the selecting the at least one buffer comprises selecting the at least one buffer based at least partly on at least one from a group consisting of:
an information type;
buffer availability; and
a replacement algorithm.

14. The method of claim 10 further comprising:
determining whether at least one buffer associated with the master device identifier of the received access request is available; and
selecting a buffer associated with the master device identifier of the received access request for loading fetched data into, if it is determined that such a buffer associated with the master device identifier of the received access request is available.

15. The method of claim 14 wherein the selecting the buffer associated with the master device identifier of the received access request based at least partly on a defined replacement algorithm, if it is determined that such a buffer associated with the master device identifier of the received access request is not available.

16. The method of claim 10 further comprising:
upon data within a buffer being fully read by a master device, freeing up that buffer to make it available for subsequently fetched data.

17. A non-transitory tangible computer program product having executable program code stored therein for providing data access control between at least one data storage device and a plurality of master devices, the program code operable for, within a data processing system:
fetching data from the at least one data storage device in response to a received memory access request comprising a master device identifier;
selecting at least one buffer from among a plurality of buffers based at least partly on the master device identifier of the received access request;
configuring the selected at least one buffer based on a master device type indicator, wherein the master device type indicator identifies a type of the master device; and
loading the fetched data into the selected at least one buffer.

18. The tangible computer program product of claim 17 wherein the tangible computer program product comprises at least one from a group consisting of: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

* * * * *